(12) United States Patent
Kim

(10) Patent No.: US 8,956,756 B2
(45) Date of Patent: Feb. 17, 2015

(54) SECONDARY BATTERY AND BATTERY PACK INCLUDING THE SAME

(75) Inventor: Dukjung Kim, Yongin-si (KR)

(73) Assignees: Samsung SDI Co., Ltd., Yongin-Si, Gyeonggi-Do (KW); Robert Bosch GmbH, Stuttgart (DE)

(*) Notice: Subject to any disclaimer, the term of this patent is extended or adjusted under 35 U.S.C. 154(b) by 427 days.

(21) Appl. No.: 13/281,517

(22) Filed: Oct. 26, 2011

(65) Prior Publication Data

US 2012/0156548 A1    Jun. 21, 2012

(30) Foreign Application Priority Data

Dec. 17, 2010    (KR) .................. 10-2010-0135599

(51) Int. Cl.
| | |
|---|---|
| H01M 2/30 | (2006.01) |
| H01M 2/02 | (2006.01) |
| H01M 2/06 | (2006.01) |
| H01M 2/26 | (2006.01) |
| H01M 10/04 | (2006.01) |

(52) U.S. Cl.
CPC ............ *H01M 2/305* (2013.01); *H01M 2/0237* (2013.01); *H01M 2/06* (2013.01); *H01M 2/263* (2013.01); *H01M 2/307* (2013.01); *H01M 10/0431* (2013.01)
USPC ............................ 429/181; 429/158; 429/160

(58) Field of Classification Search
CPC .................................. H01M 2/30; H01M 2/307
USPC ........................................ 429/158, 160, 161
See application file for complete search history.

(56) References Cited

U.S. PATENT DOCUMENTS

2010/0143786 A1* 6/2010 Kim .............................. 429/158
2010/0233528 A1    9/2010 Kim et al.

FOREIGN PATENT DOCUMENTS

| JP | 2003-092103 A | 3/2003 |
| JP | 2007-188787 A | 7/2007 |
| JP | 2010-015784 A | 1/2010 |
| KR | 10-2010-0102462 A | 9/2010 |

OTHER PUBLICATIONS

Korean Office action for KR Application No. 10-2010-0135599 dated May 21, 2012. (Kim).

* cited by examiner

*Primary Examiner* — Jonathan G Leong
*Assistant Examiner* — James Erwin
(74) *Attorney, Agent, or Firm* — Lee& Morse, P.C.

(57) ABSTRACT

A secondary battery includes an electrode assembly having a first electrode plate, a separator, and a second electrode plate, a collecting plate electrically connected to the electrode assembly, a case configured to accommodate the electrode assembly and the collecting plate, a cap plate configured to seal the case, and an electrode terminal part disposed through the cap plate and electrically connected to the collecting plate, the electrode terminal part including a first electrode terminal, a second electrode terminal, and a third electrode terminal.

14 Claims, 7 Drawing Sheets

SECONDARY BATTERY AND BATTERY PACK INCLUDING THE SAME

BACKGROUND

1. Field

Embodiments relate to a secondary battery and a battery pack including the secondary battery.

2. Description of the Related Art

Secondary batteries are rechargeable, unlike primary batteries. Among such secondary batteries, a low capacity battery including a battery cell in the form of a pack may be used for small portable electronic devices, e.g., cellular phones and camcorders, and a high capacity battery including dozens of battery cells connected to one another may be used as a motor-driving power source, e.g., for electric scooters, hybrid vehicles, or electric vehicles.

Secondary batteries may be manufactured in various shapes, e.g., a cylindrical shape and a prismatic shape. A secondary battery may be constructed as follows: an electrode assembly formed by disposing an insulating separator between a positive electrode plate and a negative electrode plate may be placed in a case together with an electrolyte, and a cap plate may be disposed on the case. The electrode assembly may be connected to positive and negative terminals which protrude from the cap plate and are exposed to the exterior of the secondary battery.

SUMMARY

Embodiments are directed to a secondary battery. The secondary battery may include an electrode assembly having a first electrode plate, a separator, and a second electrode plate, a collecting plate electrically connected to the electrode assembly, a case configured to accommodate the electrode assembly and the collecting plate, a cap plate configured to seal the case, and an electrode terminal part disposed through the cap plate and electrically connected to the collecting plate, the electrode terminal part including a first electrode terminal, a second electrode terminal, and a third electrode terminal.

The first and second electrode terminals may be formed in one piece to be integral with each other.

The first to third electrode terminals may be formed in one piece to be integral with each other.

The first and second electrode terminals may include screw threads on outer surfaces thereof, the second electrode terminal extending through the cap plate into the case.

The secondary may further include an upper insulation member on an upper side of the cap plate to be external to the case, the upper insulation member contacting a screw thread of the second electrode terminal.

The third electrode terminal may be wider than the second electrode terminal, the third electrode terminal being between the upper insulation member and the first electrode terminal.

The third electrode terminal may include a bent part, the bent part being inserted into and affixed to the upper insulation member.

The third electrode terminal may be between the first and second electrode terminals, the second electrode terminal being between the third electrode terminal and the electrode assembly.

The secondary battery may further include an auxiliary seal member between the third electrode terminal and the upper insulation member.

The secondary battery may further include an upper seal member between the upper insulation member and the cap plate.

The secondary battery may further include a connection member between the electrode terminal part and the cap plate, the connection member being connected to the collecting plate.

The secondary battery may further include a lower insulation member under the cap plate around the connection member.

The secondary battery may further include a lower seal member among the connection member, the lower insulation member, and the cap plate.

The third electrode terminal may be between the first and second electrode terminals and is wider than each of the first and second electrode terminals, the second electrode terminal directly contacting the collecting plate and including a screw thread.

The secondary battery may further include an upper insulation member between an outer surface of the cap plate and the third electrode terminal, the upper insulation member contacting the screw thread of the second electrode terminal.

Embodiments are also directed to a battery pack. The battery pack may include a plurality of secondary batteries, each secondary battery having an electrode assembly having a first electrode plate, a separator, and a second electrode plate, a collecting plate electrically connected to the electrode assembly, a case configured to accommodate the electrode assembly and the collecting plate, a cap plate configured to seal the case, and an electrode terminal part disposed through the cap plate and electrically connected to the collecting plate, the electrode terminal part including a first electrode terminal, a second electrode terminal, and a third electrode terminal, a bus bar with a penetration hole, the electrode terminal part extending through the penetration hole, and a nut coupled to the electrode terminal part to fix the bus bar to the electrode terminal part. The bus bar may be coupled to the first electrode terminal, the bus bar being positioned on the third electrode terminal. The nut may be coupled to the first electrode terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
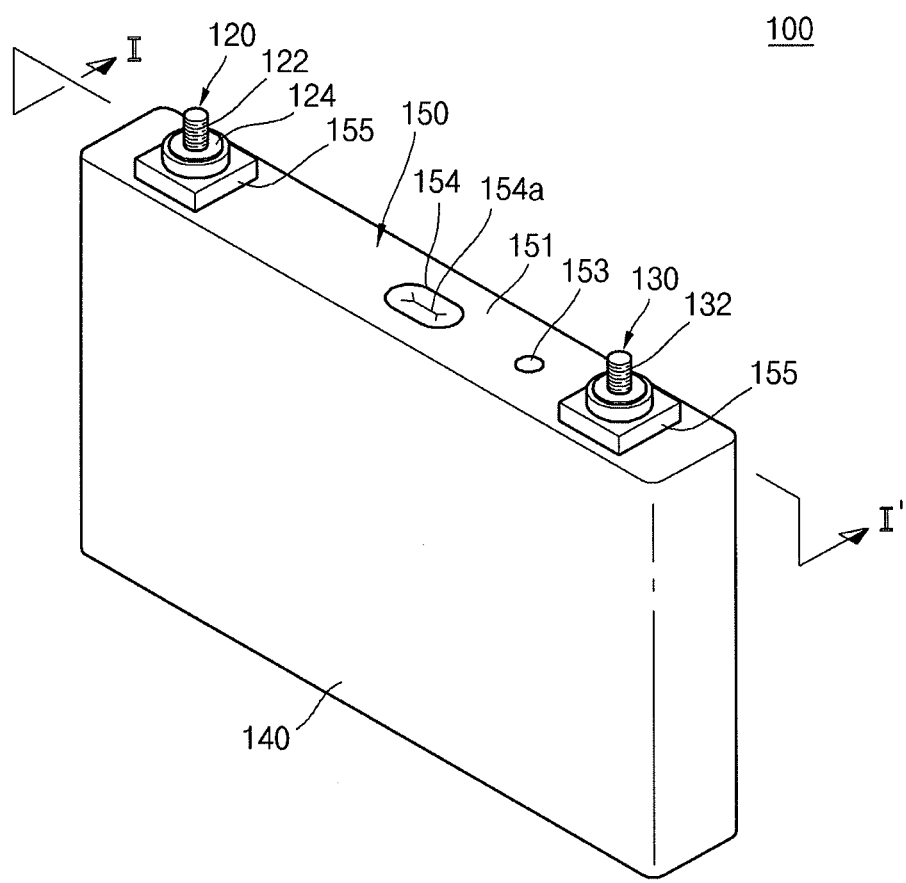
FIG. 1 illustrates a perspective view of a secondary battery according to an embodiment.

Korean Patent Application No. 10-2010-0135599 filed on Dec. 27, 2010, in the Korean Intellectual Property Office, and entitled: "Secondary Battery and Battery Pack Including the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a secondary battery and a battery pack including the secondary battery will be described with reference to the accompanying drawings according to exemplary embodiments.

Figure 2:
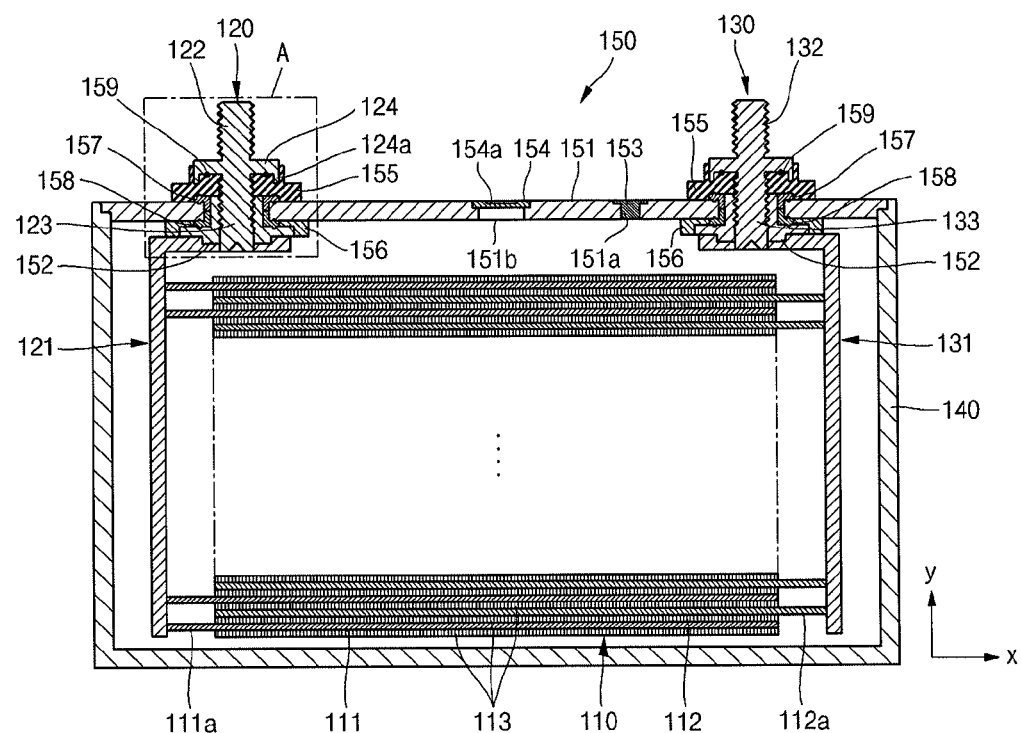
FIG. 2 illustrates a cross-sectional view of the secondary battery taken along line I-I' of FIG. 1.

FIG. 1 illustrates a perspective view of a secondary battery according to an embodiment, and FIG. 2 illustrates a cross-sectional view of the secondary battery taken along line I-I' of FIG. 1. Referring to FIGS. 1 and 2, a secondary battery 100 of an embodiment may include an electrode assembly 110, a first electrode terminal part 120, a second electrode terminal part 130, a case 140, and a cap assembly 150.

The electrode assembly 110 may include a first electrode plate 111, a second electrode plate 112, and a separator 113. The electrode assembly 110 may be formed by winding or stacking the first electrode plate 111, the separator 113, and the second electrode plate 112, which have a thin plate or film shape. The first electrode plate 111 and the second electrode plate 112 may have opposite polarities. For example, the first electrode plate 111 may function as a negative electrode, and the second electrode plate 112 may function as a positive electrode (or vice versa).

The first electrode plate 111 may be formed by applying a first electrode active material, e.g., graphite or carbon, to a first electrode collector formed of metal foil, e.g., copper or nickel foil. The first electrode plate 111 may include a first electrode non-coating portion 111a to which the first electrode active material is not applied. The first electrode non-coating portion 111a functions as a current flow passage between the first electrode plate 111 and the outside of the first electrode plate 111. In embodiments, materials that can be used to form the first electrode plate 111 are not limited to the above-mentioned materials.

The second electrode plate 112 may be formed by applying a second electrode active material, e.g., a transition metal oxide, to a second electrode collector formed of metal foil, e.g., aluminum foil. The second electrode plate 112 may include a second electrode non-coating portion 112a to which the second electrode active material is not applied. The second electrode non-coating portion 112a functions as a current flow passage between the second electrode plate 112 and the outside of the second electrode plate 112. In embodiments, materials that can be used to form the second electrode plate 112 are not limited to the above-mentioned materials.

The separator 113 may be disposed between the first electrode plate 111 and the second electrode plate 112 to prevent a short circuit and to allow movement of lithium ions. The separator 113 may be formed of, e.g., a poly ethylene film, a poly propylene film, or a film including poly ethylene and poly propylene. In embodiments, materials that can be used to form the separator 113 are not limited to the above-mentioned materials.

The first and second electrode terminal parts 120 and 130 may be coupled to both end parts of the electrode assembly 110 in a manner such that the first and second electrode terminal parts 120 and 130 are electrically connected to the first and second electrode plates 111 and 112, respectively. The electrode assembly 110 is accommodated in the case 140 together with an electrolyte. The electrolyte may include an organic solvent, e.g., ethylene carbonate (EC), propylene carbonate (PC), diethyl carbonate (DEC), ethyl methyl carbonate (EMC), and/or dimethyl carbonate (DMC), and a lithium salt, e.g., $LiPF_6$ and/or $LiBF_4$. The electrolyte may be liquid, solid, or gel.

The first electrode terminal part 120 may be formed of a metal or an equivalent thereof, and may be electrically connected to the first electrode plate 111. The first electrode terminal part 120 may include a first collecting plate 121, a first electrode terminal 122, a second electrode terminal 123, and a third electrode terminal 124. The first electrode terminal part 120 will be described in more detail below with reference to FIG. 3, illustrating an enlarged view of part A of FIG. 2.

Figure 3:
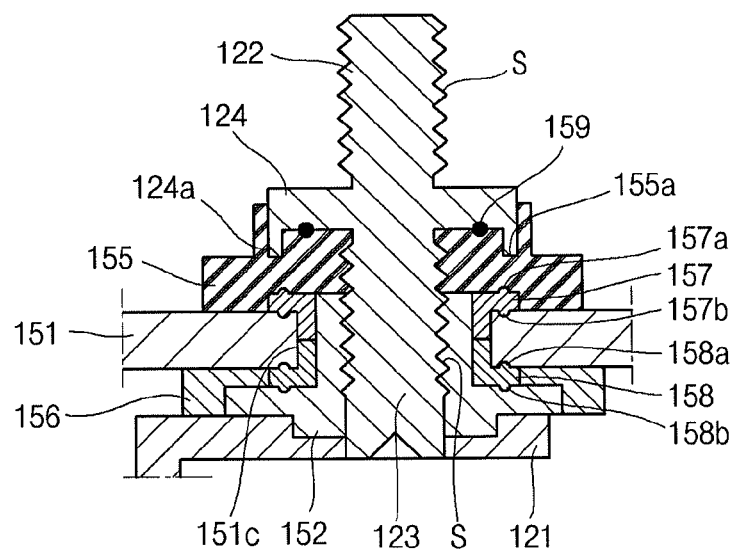
FIG. 3 illustrates an enlarged cross-sectional view of portion A of FIG. 2.

Referring to FIGS. 2-3, in the first electrode terminal part 120, the first electrode terminal 122 and the second electrode terminal 123 may be formed on top and bottom sides of the third electrode terminal 124, i.e., the third electrode terminal 124 may be between the first and second electrode terminals 122 and 123. A major surface of the third electrode terminal 124 may extend along a first direction, e.g., along an x-axis, and the third electrode terminal 124 may be wider than each of the first electrode terminal 122 and the second electrode terminal 123 along the first direction.

The first collecting plate 121 may contact, e.g., directly contact, the first electrode non-coating portion 111a protruding from an end of the electrode assembly 110. The first collecting plate 121 may be welded to the first electrode non-coating portion 111a. The first collecting plate 121 may have an approximately inverted L-shape. For example, the first collecting plate 121 may be formed of copper or a copper alloy. However, materials that can be used to form the first collecting plate 121 are not limited thereto.

The first electrode terminal 122 may have a threaded cylinder shape and may be disposed on the top side of the third electrode terminal 124 along a second direction substantially perpendicular to the first direction, i.e., a major surface of the first electrode terminal 122 may extend along the y-axis. As such, the first electrode terminal 122 may protrude from the top side of the third electrode terminal 124 by a predetermined length, e.g., the first and third electrode terminals 122 and 124 may define an inverted T-shape structure. For example, the first electrode terminal 122 may be formed of copper, a copper alloy, and/or an equivalent thereof. However, materials that can be used to form the first electrode terminal 122 are not limited thereto. A screw thread S may be formed on an outer surface of the first electrode terminal 122 for coupling with other parts.

The second electrode terminal 123 may have a threaded cylinder shape, e.g., the second electrode terminal 123 may include a screw thread S along its entire length between the third electrode terminal 124 and the collecting plate 121, and may extend from the first electrode terminal 122 through a hole 151c in the cap plate 151 along the second direction. For example, the second electrode terminal 123 may extend from a bottom of the third electrode terminal 124, such that the second and third electrode terminals 123 and 124 together define an upright T-shape structure. Therefore, when the first and second electrode terminals 122 and 123 are aligned to form a straight line, with the third electrode terminal 124 therebetween and perpendicular thereto, the first through third electrode terminals may define a structure with a shape of "+". The second electrode terminal 123 may be electrically connected to the first collecting plate 121 at a position under the cap plate 151. For example, the second electrode terminal 123 may be formed of copper, a copper alloy, and/or an equivalent thereof. However, materials that can be used to form the second electrode terminal 123 are not limited thereto. A lower end of the second electrode terminal 123 may be coupled to the first collecting plate 121, e.g., by laser welding. The second electrode terminal 123 may be electrically insulated from the cap plate 151. The first electrode terminal 122 and the second electrode terminal 123 may be formed in one piece, i.e., may be integral with each other to define a single uniform unit.

The third electrode terminal 124 may be disposed between the first electrode terminal 122 and the second electrode terminal 123 and may be wider than each of the first electrode terminal 122 and the second electrode terminal 123. The third electrode terminal 124 may be positioned between the first electrode terminal 122 and the cap plate 151, and may be larger, i.e., wider, than the hole 151c of the cap plate 151. Therefore, the third electrode terminal 124 may reinforce an attachment between the first electrode terminal 122 and the cap plate 151, so the first electrode terminal 122 may not detach from the cap plate 151. In this regard, it is noted that the width of the third electrode terminal 124 may be measured along a same direction as the width of the hole 151c.

Further, the third electrode terminal 124 may be shaped to avoid being rotated. That is, the third electrode terminal 124 may be shaped at an outer side thereof, as shown in the drawings, or at an inner side thereof. However, the shape of the third electrode terminal 124 is not limited to such shapes and positions. For example, a groove may be formed on a bottom side of the third electrode terminal 124, so that an auxiliary seal member 159 may be inserted in the groove. The third electrode terminal 124, the first electrode terminal 122, and the second electrode terminal 123 may be formed in one piece, i.e., integral with each other.

A vertically bent part 124a may be formed along the outer side of the third electrode terminal 124, so that the third electrode terminal 124 may be coupled and fixed to an upper insulation member 155 via the vertically bent part 124a. For example, the vertically bent part 124a may extend downward from the third electrode terminal 124 toward the cap plate 151, and may be inserted into the upper insulation member 155 that separates the cap plate 151 and the third electrode terminal 124.

The second electrode terminal part 130 may be formed of a metal or an equivalent thereof, and may be electrically connected to the second electrode plate 112. The second electrode terminal part 130 may include a second collecting plate 131, a second upper terminal column 132, a second lower terminal column 133, and a middle electrode plate therebetween. The second electrode terminal part 130 may have a same or a substantially same shape as that of the first electrode terminal part 120. Thus, the shape of the second electrode terminal part 130 will not described again. The second collecting plate 131 and the second upper terminal column 132 may usually be formed of aluminum, an aluminum alloy, and/or an equivalent thereof. However, materials that can be used to form the second collecting plate 131 and the second upper terminal column 132 are not limited to such materials.

The case 140 may be formed of a conductive metal, e.g., aluminum, an aluminum alloy, or steel plated with nickel. For example, the case 140 may have a polyhedral shape with an opening, so that the electrode assembly 110, the first electrode terminal part 120, and the second electrode terminal part 130 may be inserted and placed in the case 140. It is noted that FIG. 2 illustrates a state where the case 140 and the cap assembly 150 are coupled to each other, and the opening of the case 140 is not shown. However, the peripheral part of the cap assembly 150 substantially corresponds to the opening of the case 140. The inner surface of the case 140 may be treated to be electrically insulated from the electrode assembly 110, the first and second electrode terminal parts 120 and 130, and the cap assembly 150.

The cap assembly 150 may be coupled to the case 140. In detail, the cap assembly 150 may include the cap plate 151, a connection member 152, a plug 153, a safety vent 154, the upper insulation member 155, a lower insulation member 156, an upper seal member 157, a lower seal member 158, and the auxiliary seal member 159.

The cap plate 151 closes the opening of the case 140, and may be formed of the same material as that used to form the case 140. For example, the cap plate 151 may be coupled to the case 140 by laser welding. As described above, the cap plate 151 may have the same polarity as that of the second electrode terminal part 130. In this case, the cap plate 151 and the case 140 may have the same polarity.

The connection member 152 may be disposed through the hole 151c between the screw thread S of the second electrode terminal 123 and the cap plate 151. Protrusions 152a (FIG. 4B) may be formed on a bottom side of the connection member 152. The protrusions 152a may be inserted into holes 121a (FIGS. 4A and 4B) of the first collecting plate 121, and lower ends of the protrusions 152a are deformed like a rivet. The number of the protrusions 152a is not limited, e.g., at least one four protrusion 152a may be provided. After the connection member 152 is riveted, the connection member 152 and the first collecting plate 121 may be welded together, e.g., by using a laser.

The plug 153 seals an electrolyte injection hole 151a of the cap plate 151. The safety vent 154 is disposed in a vent hole 151b of the cap plate 151, and a notch 154a may be formed in the safety vent 154 so that the safety vent 154 can be opened at a preset pressure.

The upper insulation member 155 may contact the connection member 152 and the screw thread S of the second electrode terminal 123. The upper insulation member 155 may be disposed on the top side of the cap plate 151. In addition, the upper insulation member 155 may include a groove 155a, so that the vertically bent part 124a may be inserted into the groove 155a. In addition, the upper insulation member 155 may make a tight contact with the cap plate 151. The second electrode terminal 123 and the upper insulation member 155 may be coupled and fixed to each other. In detail, the second electrode terminal 123 may be inserted in the upper insulation member 155 and may be coupled with the upper insulation member 155. Therefore, the second electrode terminal 123 and the upper insulation member 155 may be securely coupled to each other.

The lower insulation member 156 may be disposed under the cap plate 151 around the connection member 152 to prevent an unnecessary short circuit. That is, the lower insulation member 156 prevents a short circuit between the cap plate 151 and each of the first and second collecting plates 121 and 131.

The upper seal member 157 may be disposed among, e.g., and in contact with, the connection member 152, the upper insulation member 155, and the cap plate 151. The upper seal member 157 may have a circular ring shape. A first upper protrusion 157*a* may be formed on an upper surface of the upper seal member 157 for making tight contact with the upper insulation member 155, and a second upper protrusion 157*b* may be formed on a lower surface of the upper seal member 157 for making a tight contact with the cap plate 151. The upper seal member 157 may be formed, e.g., of rubber or silicon. The first and second upper protrusions 157*a* and 157*b* prevent permeation of moisture from an outside area.

The lower seal member 158 may be disposed among, e.g., in contact with, the connection member 152, the lower insulation member 156, and the cap plate 151. The upper seal member 157 may have a circular ring shape. A first lower protrusion 158*a* may be formed on an upper surface of the lower seal member 158 for making tight contact with the cap plate 151, and a second lower protrusion 158*b* may be formed on a lower surface of the lower seal member 158 for making tight contact with the connection member 152. The lower seal member 158 may be formed, e.g., of rubber or silicon. Like the first and second upper protrusions 157*a* and 157*b*, the first and second lower protrusions 158*a* and 158*b* prevent permeation of moisture from an outside area.

The auxiliary seal member 159 may be disposed and fixed between the third electrode terminal 124 and the upper insulation member 155. The auxiliary seal member 159 may have a circular ring shape and may be formed, e.g., of rubber or silicon. The auxiliary seal member 159 may be disposed in a groove 124*b* (FIG. 4A) of the third electrode terminal 124 and a groove 155*b* (FIG. 4A) of the upper insulation member 155.

Next, a coupling method for the first electrode terminal part 120 and the second electrode terminal part 130 will now be described according to an embodiment. Since the first and second electrode terminal parts 120 and 130 have the same structure, an explanation will be given based on the first electrode terminal part 120.

Figure 4A:
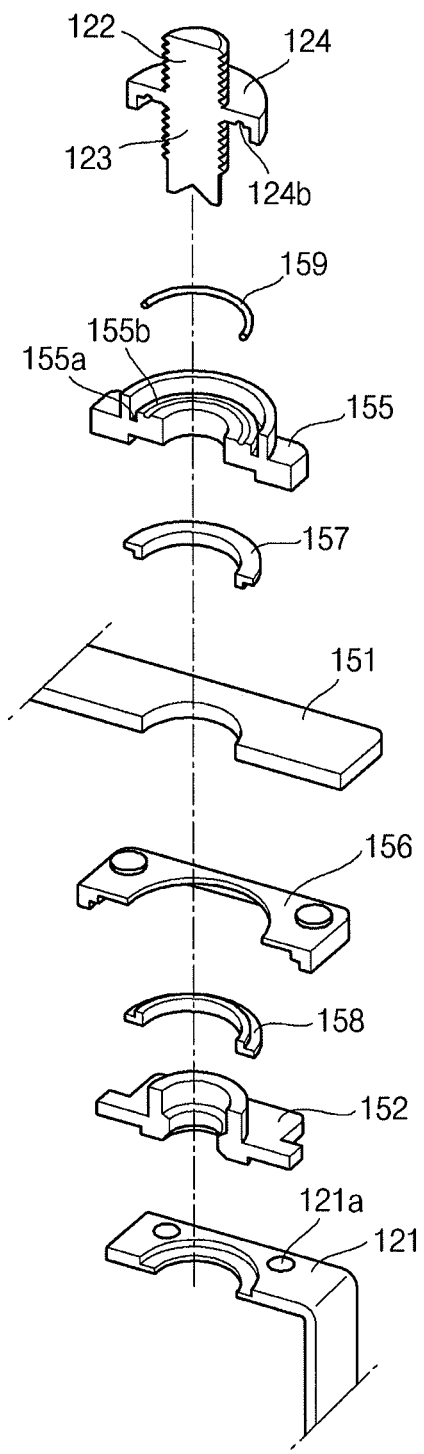
FIGS. 4A through 4C illustrate exploded views of a method for coupling a terminal of the secondary battery according to an embodiment.
Figure 4B:
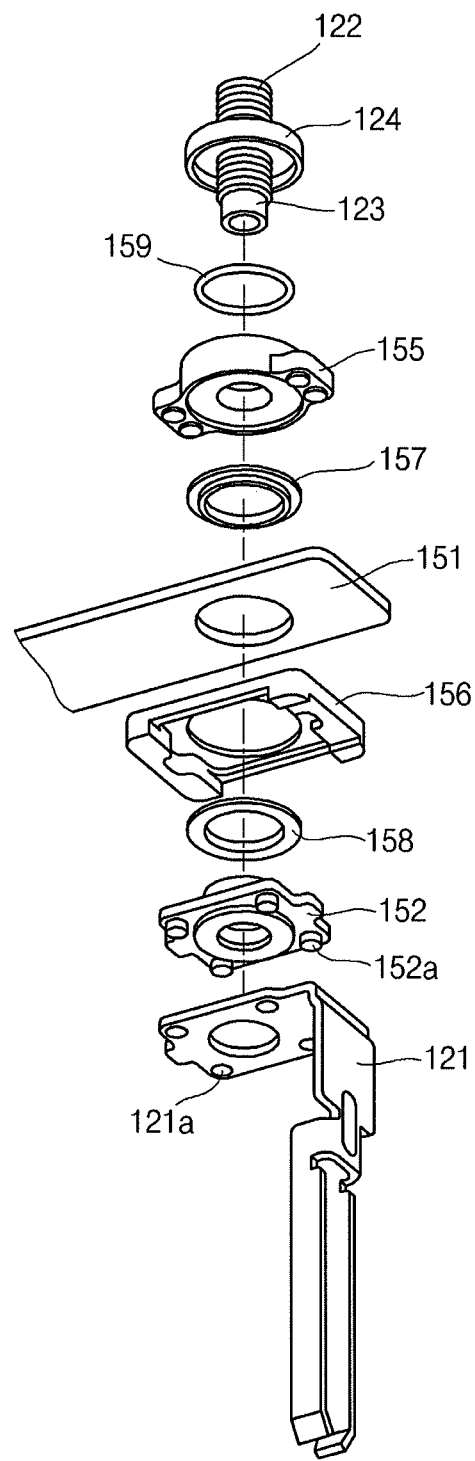
Figure 4C:
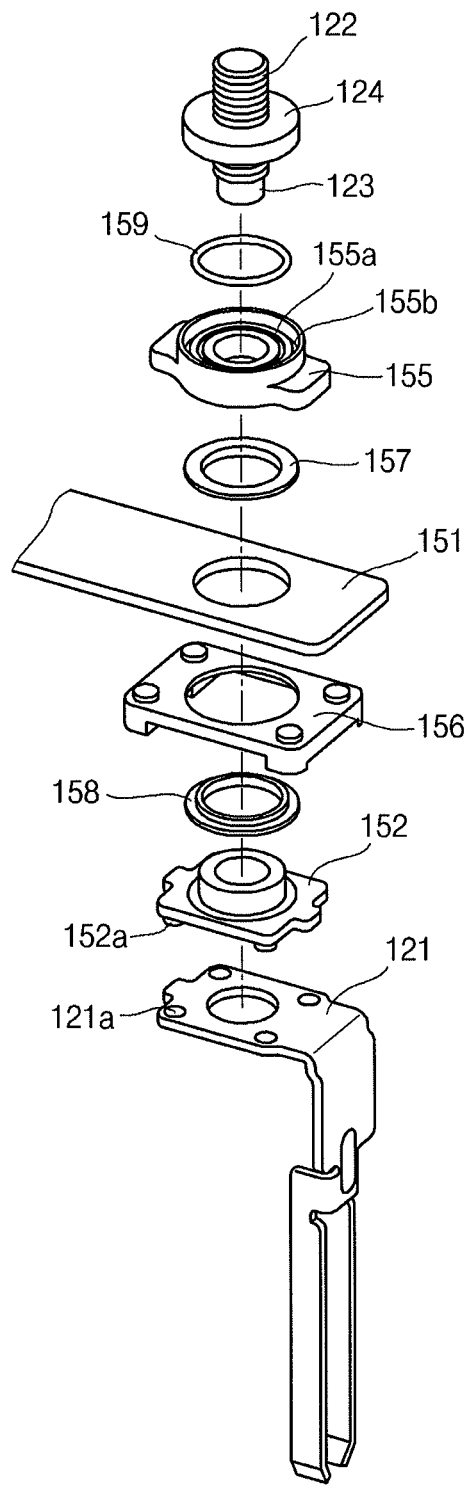

FIGS. 4A through 4C illustrate views of a method for coupling the electrode terminal part 120 of the secondary battery 100 according to an embodiment. In particular, FIG. 4A illustrates an exploded cross-sectional view of the components of the electrode terminal part 120, FIG. 4B illustrates an exploded bottom perspective view of the components of the electrode terminal part 120, and FIG. 4C illustrates an exploded top perspective view of the components of the electrode terminal part 120.

As discussed previously and as illustrated in FIGS. 4A-4B, the third electrode terminal 124 may be formed between, e.g., and integrally with, the first electrode terminal 122 and the second electrode terminal 123, and the vertically bent part 124*a* may be formed in a direction perpendicular to the third electrode terminal 124 (FIG. 4A). As illustrated in FIG. 4A, the auxiliary seal member 159 may be aligned between the groove 124*b* of the third electrode terminal 124 and the groove 155*b* of the upper insulation member 155. Then, the second electrode terminal 123 and the upper insulation member 155 may be coupled to each other with the auxiliary seal member 159 therebetween, so the vertically bent part 124*a* may be coupled into the groove 155*a* of the upper insulation member 155 and the auxiliary seal member 159 may fit between and seal the groove 124*b* and the groove 155*b* (FIG. 4A). At this time, since two grooves (groove 155*a* and groove 155*b*) are formed in the topside of the upper insulation member 155, the auxiliary seal member 159 may be placed in the inner groove 155*b*, and the vertically bent part 124*a* may be placed in the outer groove 155*a*.

The upper seal member 157 may be arranged between the bottom side of the upper insulation member 155 and the topside of the cap plate 151. A groove may be formed in the bottom side of the upper insulation member 155 for placing the upper seal member 157.

Next, the lower seal member 158 may be fixed to the bottom side of the cap plate 151, and the lower insulation member 156 may be affixed to a perimeter of the lower seal member 158. The connection member 152 may be disposed under the lower insulation member 156 to surround the second electrode terminal 123. The upper seal member 157 and the lower seal member 158 are disposed around the connection member 152.

The four protrusions 152*a* formed on the bottom side of the connection member 152 may be inserted in the holes 121*a* of the first collecting plate 121. Then, the first collecting plate 121 and the second electrode terminal 123 may be securely coupled and fixed to each other by laser welding.

Figure 5:
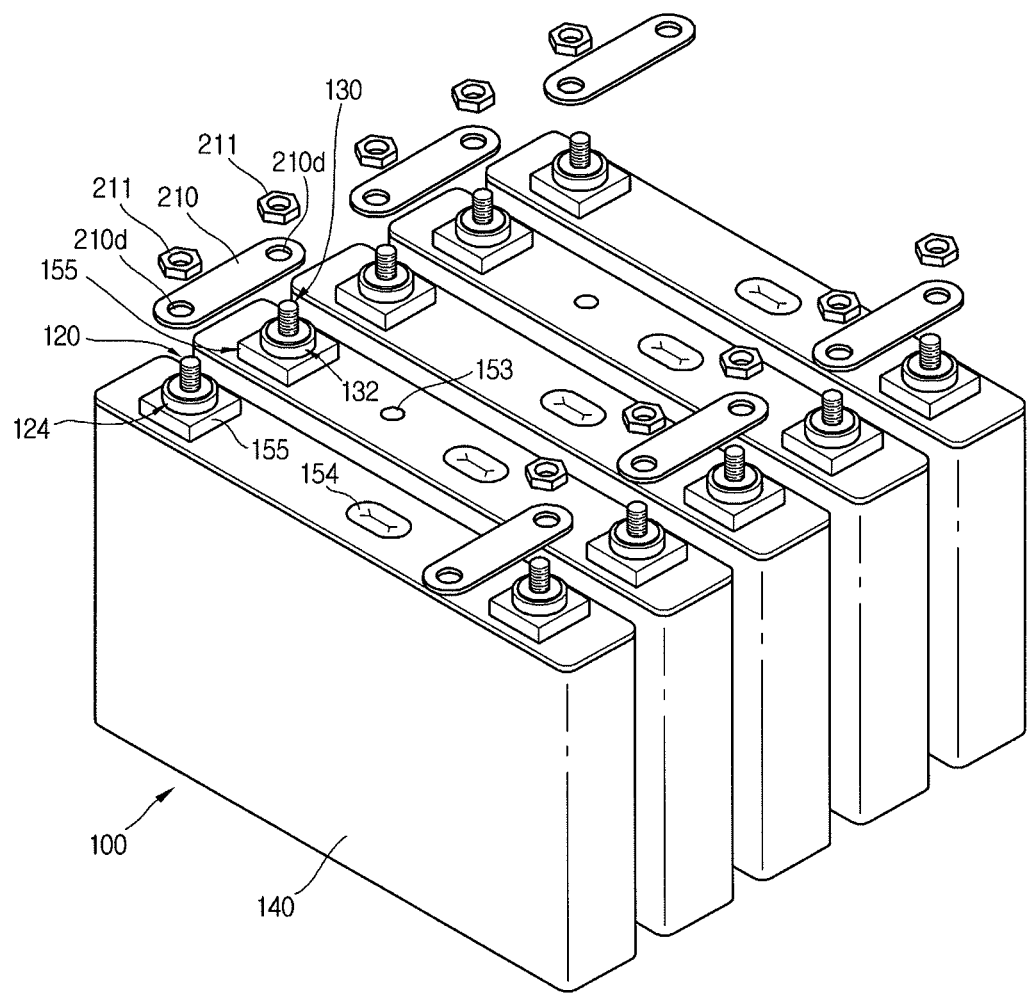
FIG. 5 illustrates a perspective view of a method for coupling secondary batteries with bus bars according to an embodiment.

FIG. 5 illustrates a view for explaining a method of coupling secondary batteries with bus bars according to an embodiment. As illustrated in FIG. 5, a plurality of secondary batteries 100 may be connected in series and/or in parallel with each other by using conductive bus bars 210. Penetration holes 210*d* may be formed through both sides of the bus bars 210, and first electrode terminals 122 and second upper terminal columns 132 of the secondary batteries 100 are coupled to the penetration holes 210*d*. Nuts 211 are coupled to the first electrode terminals 122 and the second upper terminal columns 132 inserted through the conductive bus bars 210 by applying sufficient torque to the nuts 211.

Since the bus bars 210 are coupled to the first electrode terminals 122 and the second upper terminal columns 132 by using the nuts 211, the bus bars 210 may be in tight contact with the third electrode terminals 124. In this way, since the bus bars 210 are securely coupled to the first electrode terminals 122 by using the nuts 211, the coupling force between the bus bars 210 and the first electrode terminals 122 may be improved.

Figure 6:
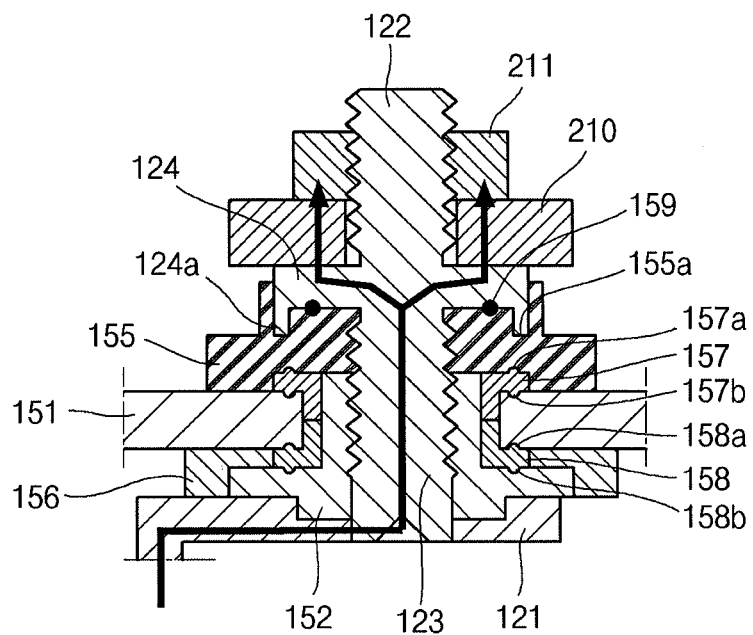
FIG. 6 illustrates a cross-sectional view of a coupled state of a terminal of a secondary battery and a bus bar according to an embodiment.

FIG. 6 illustrates a cross-sectional view of a coupled state of terminals of a secondary battery and a bus bar according to an embodiment. As shown in FIG. 6, a bus bar 210 may be coupled to a first electrode terminal 122. That is, the first electrode terminal 122 may be inserted through a penetration hole 210*d* of the bus bar 210, and a part of the first electrode terminal 122 corresponding to the topside of the bus bar 210 may be coupled with a nut 211. Therefore, the bus bar 210 may be brought into tight contact with a third electrode terminal 124, i.e., the nut 211 may tighten along the screw thread S of the first electrode terminal 122 to set the bus bar 210 into close surface contact with the third electrode terminal 124.

The nut 211 may be tightened to the first electrode terminal 122 by a relatively large torque. However, although large torque is applied to the nut 211, the first electrode terminal 122 may not be damaged due to the contact between the bus bar 210 and the third electrode terminal 124. In other words, as the third electrode terminal 124 is tightly secured by the upper insulation layer 155 in its position, e.g., via the auxiliary seal 159 and the vertically bent part 124*a*, when the nut 211 is rotated around the first electrode terminal 122 and is tightened against the bus bar 210, coupling of the bus bar 210 and the first electrode terminal 122 may be improved without damaging the first electrode terminal 122. Therefore, relatively large torque may be applied to the nut 211, e.g., as compared with the case of the related art. Thus, the coupling force between the bus bar 210 and first and second electrode terminal parts 120 and 130 may be improved for durability against vibration and impact.

According to the embodiments, the threaded electrode terminal may be first coupled to a neighboring device, and then a lower part of the threaded electrode terminal may be easily coupled to the collecting plate. In addition, according to the secondary battery and the battery pack including the secondary battery of the embodiments, limitations of electrode terminal design may be minimized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery, comprising:
   an electrode assembly having a first electrode plate, a separator, and a second electrode plate;
   a collecting plate electrically connected to the electrode assembly;
   a case configured to accommodate the electrode assembly and the collecting plate;
   a cap plate configured to seal the case;
   an electrode terminal part disposed through the cap plate and electrically connected to the collecting plate, the electrode terminal part including a first electrode terminal, a second electrode terminal, and a third electrode terminal, wherein the first and second electrode terminals include screw threads on outer surfaces thereof, the second electrode terminal extending through the cap plate into the case; and
   a connection member between the second electrode terminal and the cap plate, wherein the first, second, and third electrode terminals are integral such that the first, second, and third electrode terminals are collectively a single piece, and
   wherein the connection member is coupled to the second electrode terminal through the screw threads and a lower end thereof is coupled to the collecting plate through riveting.

2. The secondary battery as claimed in claim 1, further comprising an upper insulation member on an upper side of the cap plate to be external to the case, the upper insulation member contacting a screw thread of the second electrode terminal.

3. The secondary battery as claimed in claim 2, wherein the third electrode terminal is wider than the second electrode terminal, the third electrode terminal being between the upper insulation member and the first electrode terminal.

4. The secondary battery as claimed in claim 3, wherein the third electrode terminal includes a bent part, the bent part being inserted into and affixed to the upper insulation member.

5. The secondary battery as claimed in claim 3, wherein the third electrode terminal is between the first and second electrode terminals, the second electrode terminal being between the third electrode terminal and the electrode assembly.

6. The secondary battery as claimed in claim 3, further comprising an auxiliary seal member between the third electrode terminal and the upper insulation member.

7. The secondary battery as claimed in claim 2, further comprising an upper seal member between the upper insulation member and the cap plate.

8. The secondary battery as claimed in claim 1, further comprising a lower insulation member under the cap plate around the connection member.

9. The secondary battery as claimed in claim 8, further comprising a lower seal member between the connection member and the cap plate.

10. The secondary battery as claimed in claim 1, wherein the third electrode terminal is between the first and second electrode terminals and is wider than each of the first and second electrode terminals, the second electrode terminal directly contacting the collecting plate and including a screw thread.

11. The secondary battery as claimed in claim 10, further comprising an upper insulation member between an outer surface of the cap plate and the third electrode terminal, the upper insulation member contacting the screw thread of the second electrode terminal.

12. A battery pack, comprising:
    a plurality of secondary batteries, each secondary battery including:
      an electrode assembly having a first electrode plate, a separator, and a second electrode plate,
      a collecting plate electrically connected to the electrode assembly,
      a case configured to accommodate the electrode assembly and the collecting plate,
      a cap plate configured to seal the case,
      an electrode terminal part disposed through the cap plate and electrically connected to the collecting plate, the electrode terminal part including a first electrode terminal, a second electrode terminal, and a third electrode terminal, wherein the first and second electrode terminals include screw threads on outer surfaces thereof, the second electrode terminal extending through the cap plate into the case, and the first, second, and third electrode terminals are integral such that the first, second, and third electrode terminals are collectively a single piece; and
      a connection member between the second electrode terminal and the cap plate, the connection member being coupled to the second electrode terminal through the screw threads, and a lower end of the connection member being coupled to the collecting plate through riveting;
    a bus bar with a penetration hole, the electrode terminal part extending through the penetration hole; and
    a nut coupled to the electrode terminal part to fix the bus bar to the electrode terminal part.

13. The battery pack as claimed in claim 12, wherein the bus bar is coupled to the first electrode terminal, the bus bar being positioned on the third electrode terminal.

14. The battery pack as claimed in claim 12, wherein the nut is coupled to the first electrode terminal.

* * * * *